United States Patent [19]

van Der wal et al.

[11] Patent Number: 4,980,445

[45] Date of Patent: Dec. 25, 1990

[54] THERMOPLASTIC POLYURETHANES

[75] Inventors: Hanno R. van Der wal, Delfzijl, Netherlands; Henry W. Bonk, Wallingford, Conn.; John Penfold, Uetliberg, Switzerland

[73] Assignee: The Dow Chemical Company, Midland, Mich.

[21] Appl. No.: 298,074

[22] Filed: Jan. 17, 1989

[51] Int. Cl.$^5$ .................... C08G 18/42; C08G 18/48
[52] U.S. Cl. ...................................................... 528/76
[58] Field of Search .......................................... 528/76

[56]   References Cited
       U.S. PATENT DOCUMENTS

| | | | |
|---|---|---|---|
| 3,493,634 | 2/1970 | Kolycheck | 528/80 |
| 3,746,665 | 7/1973 | Koleske et al. | 528/76 |
| 3,838,105 | 9/1974 | Brachman | 528/76 |
| 4,124,572 | 11/1978 | Mao | 528/76 |
| 4,182,898 | 1/1980 | Fujiwara et al. | 528/76 |
| 4,371,684 | 2/1983 | Quiring et al. | 528/76 |
| 4,420,601 | 12/1983 | Kuroda et al. | 528/76 |
| 4,767,825 | 8/1988 | Pazos et al. | 528/76 |

Primary Examiner—Maurice J. Welsh
Assistant Examiner—Rabon Sergent
Attorney, Agent, or Firm—Dragan J. Karadzic; David H. Fifield

[57]   ABSTRACT

The present invention concerns a thermoplastic polyurethane material which is the reaction product of (1) a mixture of (a) 0.86 to 0.98 mole equivalent of a polyester diol having the molecular weight of from 650 to 5,000 and (b) 0.02 to 0.14 mole equivalent of a polyether diol having the molecular weight of from 2,000 to 5,000, and (2) a difunctional chain extender with (3) an organic diisocyanate. These polyurethane materials exhibit high resistance to severe abrasion forces while retaining desirable mechanical properties and are useful for the manufacture of shoe soles, ski boots, ski bindings, conveyor belts and screens used by mining industry and the like.

18 Claims, No Drawings

THERMOPLASTIC POLYURETHANES

BACKGROUND OF THE INVENTION

1. Field of the Invention

The present invention relates to thermoplastic polyurethanes which have significantly improved abrasion resistance while retaining other desirable mechanical properties.

2. Description of the Prior Art

Preparation of thermoplastic polyurethane materials is well known in the art. Such materials can be extruded, injection molded and fabricated in other known manners to form many different shapes and configurations which find utility in a large number of applications.

Thermoplastic polyurethane materials can be prepared by reacting polymeric polyols, diisocyanate compounds and polyfunctional chain extender compounds having active-hydrogen groups such as hydroxyl, primary amino, secondary amino, and mixtures thereof. Various combinations of polyester polyols and polyether polyols have been employed in the preparation of polyurethane materials having a diversity of properties.

U.S. Pat. No. 3,493,634 discloses thermoplastic polyurethane elastomers prepared from a mixture of a polyester diol, polyoxyalkylene glycol and glycol extender.

U.S. Pat. No. 3,798,200 and 3,963,681 disclose polyether mixtures in the preparation of soft crosslinked polyurethanes.

U.S. Pat. No. 4,124,572 discloses blends of polyester polyols with particular polyoxypropylene-polyoxyethylene glycols which are said to have higher tensile strengths than prior art polyether and polyester based polyurethanes.

U.S. Pat. No 4,182,898 discloses the use of isocyanate terminated prepolymers prepared from a blend of polyester polyol and polyether polyol in the preparation of cast polyurethane elastomers.

U.S. Pat. No. 4,379,904 discloses a thermoplastic polyurethane elastomer having improved impact properties prepared from 4,4-methylenebis(phenyl isocyanate), difunctional extender and particular polyoxypropylene-polyoxyethylene copolymers and/or polyester diols.

British Patent No. 1,233,614 discloses polyurethanes having improved stiffness-temperature properties prepared by reacting an organic polyisocyanate with a mixture containing particular incompatible low and high molecular weight polyols.

British Patent No. 1,410,809 and its equivalent German Offenlegungsschrift No. 2,261,482 disclose a polyurethane elastomer prepared from a polyfunctional isocyanate, a curing agent and a mixture of polyethers having active-hydrogen terminal groups, wherein the weight average molecular weight of the polyether mixture is between 4,500 to 20,000 and the molecular weight distribution curve of the polyether mixture has at least two peaks. These polyurethane elastomers are alleged to have good cut growth and flex crack resistance properties.

British Patent No. 1,388,748 and 1,389,039 disclose a polyester-polyurethane product prepared by reacting a polymeric diol mixture comprising (a) 3–30 percent by weight of a high molecular weight poly(alkylene alkanedioate) glycol or poly(oxycaproyl) diol and (b) 97–70 percent by weight of a low molecular weight poly(alkylene alkanedioate) glycol or poly(oxycaproyl) diol and which polymeric diols differ in the molecular weight by at least 1,000 with an organic diisocyanate and a difunctional chain extender. These materials are said to be better adapted for end uses such as in shoe soles and solid truck tires due to their improved split tear strength and elongation properties.

British Patent No. 1,155,548 discloses polyurethane materials particularly adapted to injection molding and having a good balance of physical properties. These polyurethanes are particularly designed to overcome the problems encountered by prior art materials in injections molding such as difficulty in filling mold cavities, sticking in the mold, shrinkage and long cycle times. These polyurethanes are prepared by reacting a mixture of 60–85 parts of a hydroxyl terminated existentially linear polyester having a molecular weight between 900 and 3,000, 15–40 parts of an essentially linear hydroxyl poly(alkylene oxide) having a molecular weight between 800 and 2,000 and 1.25–12.8 mols of an aliphatic glycol per mol of total hydroxyl polyester and hydroxyl poly(alkylene oxide) with an aryl isocyanate in a molar amount equal to the total mols of hydroxyl polyester, hydroxyl poly(alkylene oxide) and aliphatic glycol.

Thermoplastic polyurethane materials have become of increasing importance for use in manufacturing shoe soles, sport shoe soles and particularly ski boots. As demand has risen for such materials so have the physical property requirements increased, particularly requirements for resistance to high abrasive and destructive forces to which ski boots and sport shoe soles are constantly subjected to. Although the prior art is capable of producing polyurethane materials which can be used in these applications, there is still great need and demand for materials which will have considerably improved resistance to abrasion forces than the prior art material.

It has now been discovered that a thermoplastic polyurethane can be prepared which exhibits surprisingly high resistance to abrasion forces while retaining a spectrum of other desirable chemical properties including high impact resistance and creep behavior. This high resistance to abrasion forces is quite unexpected in view of the performance characteristics of similar prior art materials. The new thermoplastic polyurethanes are particularly useful in the manufacture of shoe soles, sport shoe soles, ski boots and bindings, various automotive uses such as car bumpers and side guards, conveyor belts and screens for use by mining industry, oil seals and the like.

SUMMARY OF THE INVENTION

The present invention concerns a thermoplastic polyurethane comprising the reaction product of (1) a mixture of (a) 0.86 to 0.98, preferably 0.88 to 0.95, most preferably 0.88 to 0.93, mole equivalent of a polyester diol having the molecular weight of from 650 to 5,000, preferably from 1,000 to 3,000, most preferably from 1,000 to 2,000 and (b) 0.02 to 0.14, preferably 0.05 to 0.12, most preferably 0.07 to 0.12, mole equivalent of a polyether diol having the molecular weight of from 2,000 to 5,000, preferably from 2,000 to 3,000 most preferably from 2,200 to 2,900 and (2) a difunctional chain extender with (3) an organic diisocyanate.

The term "thermoplastic" is used in the generally accepted sense to those skilled in the art to mean, inter alia, the ability to be injection molded.

The thermoplastic polYurethanes of the present invention exhibit surprisingly considerably higher resistance to severe abrasion than the prior art materials while retaining a wide spectrum of other desirable mechanical properties such as high impact resistance and creep behavior.

DETAILED DESCRIPTION OF THE INVENTION

The polyester diols employed in the present invention are any of the conventional type polyester diols known to those skilled in the art. The polyester diols include both poly(alkylene alkanedioate) diols and poly(oxycaproyl) diols.

The poly(alkylene alkanedioate) diols can suitably be prepared via well-known esterification techniques using a predetermined molar excess of an alphatic glycol with relation to a dicarboxylic acid, e.g., see U.S Pat. No. 2,423,823, incorporated herein by reference. In general poly(alkylene alkanedioate) diols are suitably prepared under reaction conditions of the order of 250° C., and higher, using low pressures, e.g., less than 1 mm Hg. Water of condensation is carefully removed from the reaction by conventional equipment suitable for such purposes. Desirably, dicarboxylic acids can be unsubstituted or substituted dicarboxylic acids which contain from 4 to 12 carbon atoms and include adipic acid, succinic acid, pimelic acid, suberic acid, azelaic acid, sebacic acid and the like. Adipic acid is the most preferred dicarboxylic acid. Illustrative of the aliphatic glycols which can be employed for the preparation of poly(alkylene alkanedioate) diols are ethylene glycol, 1,3-propylene glycol, 1,4-butanediol, 1,3-butylene glycol, 1,6-hexanediol and 1,12-dodecanediol. The aliphatic glycols preferably contain from 2 to 12 carbon atoms. Mixtures of the above aliphatic glycols and/or dicarboxylic acids can also be employed.

The poly(oxycaproyl) diols contemplated by the present invention are well known in the art, e.g., see U.S Pat. No. 3,169,945, U.S. Pat. No. 3,248,417 and U.S. Pat. Nos. 3,021,309 to 3,021,317, all incorporated herein by reference. A general procedure involves reacting a molar excess of epsilon-caprolactones with an initiator which contains two active hydrogen-containing groups, e.g., hydroxyl, primary amino, secondary amino and mixtures thereof, such groups being capable of opening the lactone ring whereby it adds as an open chain to the site of the active hydrogen-containing group. The reaction is conducted at an elevated temperature, preferably in the presence of a catalyst such as tetrabutyltitanate and stannous octoate for a period of time sufficient to produce the poly(oxycaproyl) diols. By careful y controlling the purity and molar ratio of the reactants there are produced poly(oxycaproyl) diols of the desired molecular weight.

Preferred species of the polyester diols contemplated by the present invention include ply(ethylene adipate) diols, poly(propylene adipate) diols, poly(butylene adipate) diols, poly(ethylene/butylene adipate) diols and poly(oxycapropyl) diols. The most preferred polyester diol is poly(butylene adipate) diol.

Polyether diols contemplated for use in the present invention are well known, essentially linear, hydroxyl terminated materials having ether linkages as the major linkage joining carbon atoms. Illustrative polyether diols include poly(alkylene oxide)glycols such as poly(ethylene oxide) diol, poly(propylene oxide) diol, poly(tetramethylene oxide) diol, block or random polyoxypropylene/polyoxyethylene copolymeric glycol or polyoxytetramethylene/polyoxyethylene copolymeric glycol having an ethylene oxide content of about 5 to about 40 and the like. The polyether diols can be capped with ethylene oxide. Illustrative capped polyether diols include ethylene oxide capped poly(propylene oxide) diol, ethy oxide capped polYoxypropylene-polyoxyethylene glycols and the like. Poly(tetramethylene oxide) diol the most preferred polyether diol.

Poly(alkylene oxide) glycols a..e produced in accordance with procedures well-known in the art; see for example, Kunststoff Handbuch, Band 7, Polyurethane, R. Vieweg, Carel Hansel Verlag, München 1966; and U.S. Pat. No. 4,294,934, both incorporated herein by reference. Suitably, poly(alkylene oxide) glycols are prepared by polymerizing epoxides such as ethylene oxide, propylene oxide, butylene oxide or tetrahydrofuran on their own, for example in the presence of Lewis catalysts such as boron trifluoride, or by addition of these epoxides preferably ethylene oxide and propylene oxide either in admixture or successively with starter components containing reactive hydrogen atoms such as water, alcohols, ammonia or amines.

Polyoxypropylene-polyoxyethylene copolymeric glycols contemplated for use in the present invention are well known in the art and typical embodiments are described in U.S. Pat. No. 4,202,957, incorporated herein by reference. The polyoxypropylene-polyoxyethylene copolymeric glycols can be prepared by first polymerizing propylene oxide and then reacting the resulting polyoxypropylene glycol with ethylene oxide. The reaction is carried out in accordance with well-known procedures, see for example, U.S. Pat. No. 2,674,619, incorporated herein by reference. For example, the polymerization of the propylene oxide is effected by condensing propylene oxide with propylene glycol or water in the presence of a basic catalyst such as sodium hydroxide, potassium hydroxide and the like. The polymerization can be carried out to any desired extent depending on the desired molecular weight of the ultimate product. The polypropylene oxide so obtained is then reacted with ethylene oxide, also in the presence of a basic catalyst if so desired.

The difunctional chain extender which is contemplated for use in the present invention two functional groups each of which contains "active hydrogen atoms". These functional groups are in the form of hydroxyl, primary amino, secondary amino and mixtures thereof. The term "active hydrogen atoms" refers to the hydrogens which, because of their position in the molecule, display activity according to the Zerewitinoff test as described by Kohler in *J. Am. Chem. Soc.*, 49, 31–81 (1927). The difunctional chain extenders may be aliphatic, cycloaliphatic or aromatic diols, diamines or aminoalcohols. Illustrative difunctional chain extenders include ethylene glycol propylene glycol, 1,4-butane diol 1,3-butanediol, 1,5-pentanediol, 1,6-hexanediol:, ,1,10-decanediol, 1,12-dodecanediol, ethoxylated hydoquinone, 1,4-cyclohexane-diol, N-methylethanolamine, N-methylisopropanolamine, 4-aminocyclohexanol, 1,2-diaminoethane, 2,4-toluenediamine and the like. In general, it is desirable to use the difunctional chain extender which has the molecular weight of 250 or less. In the practice of the present invention, alphatic diols having molecular weight of from 50 to 250 are preferred difunctional chain extenders. Particularly preferred difunctional chain extenders are 1,4-butanediol 1,6-hexane-diol and ethoxylated hydroquinone. The difunctional extender can be a single chain extender or mixture of the above chain extenders. Where mixed chain extenders are used they can be added to the other reactants as separate components or can be preblended with either the polyester diol or polyether diol component.

In the practice of the present invention the difunctional chain extender is used in an amount of from about 2 to about 14, preferably from about 5 to about 12, most preferably from about 8 to about 10, moles for each mole of the mixture of the polyether diol and polyester diol.

Any of a wide variety of organic diisocyanate can be employed in the practice of the invention, including aromatic, aliphatic and cycloaliphatic diisocyanates and mixtures thereof. Illustrative organic diisocyanates include m- and p-phenylene diisocyanates, 2,4- and 2,6-toluene diisocyanates, 4,4-biphenylene diisocyanate, p,p'-diphenylmethane diisocyanate (MDI), 1,5-naphthalene diisocyanate, 4,4' methylenebis(cyclohexyl isocyanate) or mixtures thereof an, the like The organic diisocyanates may contain other substituents. Aromatic diisocyanates are preferred in the practice of the present invention with p,p'-diphenylmethane diisocyanate being particularly preferred.

The amount of the organic diisocyanate employed in the practice of the present invention depends on the total amount of polyether diol, polyester diol and difunctional chain extender and should be a molar equivalent to said reactants so that there are essentially no unreacted isocyanate and hydroxyl groups remaining in the reaction product. Of course small excess of either unreacted hydroxyl or isocyanate groups may be tolerated but the properties of the reaction product may suffer somewhat. Conveniently, the mole ratio of the organic diisocyanate to the polyester diol/polyether diol/chain extender mixture is from about 0.95:1 to about 1.10:1, preferably from about 0.99:1 to about 1.07:1, most preferably from about 0.99:1 to about 1.04:1.

The thermoplastic polyurethane of the present invention can be prepared according to several different known methods. In the so called "one shot" method the polyester diol, polyether diol, organic diisocyanate and difunctional chain extender and other additives if any, are simultaneously mixed and reacted at an elevated temperature. Another method involves the so called "prepolymer" method in which the mixture comprising the polyester diol and polyether diol first reacted with the organic diisocyanate to form a diisocyanate-terminated prepolymer and subsequently this prepolymer is reacted with the difunctional chain extender. Yet another method that can be used involves so called "quasi-prepolymers" method. Variations of the above methods can also be used such as first reacting the difunctional chain extender with the organic diisocyanate and then reacting the resulting product with the polyester diol and polyether diol.

Thermoplastic polyurethanes of the present invention can be prepared using the aforementioned overall ratios of the reactants over a wide temperature range, e.g., from about 20° C. to about 240° C., and higher. The reaction can be conducted in bulk or in a solvent such as dimethylformamide. The reaction can be a "one shot" method or a stepwise process ("prepolymer" method) can be used. The reaction in bulk is usually conducted at a temperature of from about 160° C. to about 240° C. for a period of time ranging from several seconds to several minutes. The reaction in a solvent is conveniently conducted at a temperature of from about 40° C. to about 160° C. for a period of time of from several minutes to several hours. The resulting partially cured polyurethane can be cooled, diced and stored and is suitable for fabricating into finished parts via techniques such as extrusion, injection molding compression molding, and similar methods familiar to the industry.

It is often desirable, but not essential, to include a catalyst in the preparation of thermoplastic polyurethanes of the present invention. Any of the catalysts conventially used in the art to catalyze or accelerate the reaction of an isocyanate with a reactive hydrogen-containing compound can be used for this purpose; see, e.g., Saunders et al, Polyurethanes, Chemistry and Technology, Part I, Interscience, New York, 1963, pp. 228–232; see also Britain et al, J. Applied Polymer Science, 4, 207–211, 1960 both incorporated herein by reference. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Illustrative of such catalysts are stannous octoate, stannous oleate, dibutyltin dioctoate, dibutyltin dilaureate, cobalt naphthanate, tetramethyltin, triethylamine, triethylenediamine, $N,N,N^1,N^1$-tetramethylenediamine, $N,N,N^1,N^1$-tetraethylenediamine, N-methylmorpholine, N-ethylmopholine, $N,N,N^1,N^1$-tetramethylguanidine, $N,N^1$-diethylethanolamine and the like. The amount of the catalyst employed is that amount which will effectively catalyze the reaction of hydroxyl containing compounds with the aromatic diisocyanate. The specific amount will depend on the particular reactants and catalyst being employed. Generally, the amount of the catalyst used is within the range of about 0.0001 to about 0.1 percent by weight based on the total weight of the reactants.

If desired, the thermoplastic polyurethanes of the present invention can have incorporated in them, at an appropriate stage of preparation, additives such as pigments, fillers, lubricants, stabilizers, antioxidants, fire retardants, mold release agents, synthetic rubbers and the like which are commonly used in conjunction with polyurethanes.

The thermoplastic polyurethanes of the present invention have considerably improved abrasion resistance while retaining other desirable mechanical properties including high impact at low temperatures and good creep properties. The thermoplastic polyurethanes of the present invention are useful in the manufacture of wide variety of products requiring high abrasion resistance such as ski boots and bindings, shoe soles, particularly sport shoe soles, various automotive uses as in car bumpers and side panel guards, oil seals, conveyor belts and screens used by mining industry and the like.

The abrasion resistance of the thermoplastic polyurethanes of the present invention is measured in the test developed in Europe for hot stamped shoe heel pieces. This test is significantly more severe than the commonly used DIN 53516 abrasion test in that the test specimens are subjected to considerably higher abrasion and temperature conditions. The test procedure used for measuring the abrasion properties of polyurethanes of this invention is as follows.

A test specimen (2×2 cm; weighing 2.30–2.40 g) is attached to the middle of a 50 cm ]long abrasion contact arm. The contact arm is movably attached at one end. The specimen is then brought into contact with the abrasive contact surface of an abrasive wheel which rotates at a speed of 56 r.p.m. (rotations per minute) for a period of time of about 10 minutes. The abrasion wheel employed is manufactured by the Rappold Schleifmittel Industrie, Vienna, Austria firm and is 15 cm in diameter with the abrasion contact surface 6.3 cm wide. The contact of the test specimen with the abrasion contact surface of the abrasion wheel is carried out under a pressure force of $17.2 N/cm^2$ brought by applying a weight load of 3.5 kg to the free end of the contact arm. After about 10 minutes, the contact of the test specimen with the abrasive surface is discontinued and the test specimen is weighed. The weight loss experienced by the test specimen is indicative of the abrasion resistance property of the tested material. The lower the weight loss, the higher the abrasion resistance property of the specimen material. The test simulates much better severe abrasion conditions than the DIN 53516 test to which materials used for the manufacture of ski boots and sport shoe soles subjected to under normal use of these articles in it involves both the heat build-up and severe abrasion force.

Various terms, abbreviations and designations used in the examples are explained hereinbelow.

DIOL BA-2000 stands for poly(butylene adipate) diol having the molecular weight of 2,000 sold by Poliol Chimica under the trademark Bester 80.

POCD-1250 stands for poly(oxycapropyl) diol having the molecular weight of 1250.

PTMEG-2000 stands for poly(tetramethylene oxide) glycol having the molecular weight of 2,000 sold by Du Pont under the trademark Theratane 2000.

PTMEG-2900 stands for poly(tetramethylene oxide) glycol having the molecular weight of 2,900.

BD stands for 1,4-Butanediol

HEQ stands for ethoxylated hydroquinone

MDI stands for $p,p^1$-diphenylmethane diisocyanate sold by The Dow Chemical Company under the trademark ISONATE 125M.

In the Examples, the general procedure for preparing thermoplastic polyurethanes is as follows.

The appropriate polyester diol, polyether diol and difunctional chain extender are dried at about 100° C. to 120° C. under about 20–30 mm Hg pressure for about 60 minutes. The dried mixture of the polyester diol and polyether diol is then fed into a twin-screw extruder feed zone along with the difunctional oh extender and melted organic diisocyanate which are fed into the feed zone through different conduits. At the same time catalyst is added to the feed mixture stream, if desired. The reaction is then carried on about 210° C. to 240° C. for several seconds and the material extruded onto a cooled conveyor belt, and through a cold water bath before dicing. The diced pellets are dried about 2–4 hours at about 70° C. The material is then injection molded to form test specimen measuring $2 \times 2$ cm and weighing 2.30–2.40 g.

EXAMPLES

Using the above-detailed procedure and the reactants and proportions set forth in Table I below, there were prepared thermoplastic polyurethane materials in separate experiments and various physical and mechanical properties were determined in accordance with established methods. The data are set out in Table I below.

TABLE I

| | Samples | | | Examples | | | | | |
|---|---|---|---|---|---|---|---|---|---|
| | A* | B* | C* | 1 | 2 | 3 | 4 | 5 | 6 |
| DIOL BA-2000 (mole) | 1 | 0.792 | — | 0.925 | 0.88 | 0.925 | 0.925 | — | 0.925 |
| POCD-1250 (mole) | — | — | 1.0 | — | — | — | — | 0.9 | — |
| PTMEG-2000 (mole) | — | 0.208 | — | 0.075 | 0.12 | — | — | — | — |
| PTMEG-2900 (mole) | — | — | — | — | — | 0.075 | 0.075 | 0.1 | 0.075 |
| BD (mole) | 8.5 | 8.5 | — | 8.5 | 8.5 | 8.5 | 8.5 | — | 7.2 |
| HEQ (mole) | — | — | 1.9 | — | — | — | — | 2.4 | — |
| MDI (mole) | 9.60 | 9.78 | 3.07 | 9.64 | 9.74 | 9.88 | 9.40 | 9.6 | 8.16 |
| Wax lubricant, weight percent | 0.10 | 0.12 | 0.2 | 0.12 | 0.12 | 0.12 | 0.12 | 0.2 | 0.12 |
| Antioxidant, weight percent | 0.10 | 0.12 | 0.15 | 0.12 | 0.12 | 0.12 | 0.12 | 0.15 | 0.12 |
| Properties: | | | | | | | | | |
| Hardness, shore D DIN 53505 | 65 | 67 | | 70 | 66 | 64 | 67 | | 64 |
| Hardness, shore A | | | 92 | | | | | 94 | |
| Tensile Strength D53455 | | | | | | | | | |
| 50% ($MN/m^2$) | 19.3 | ND | 10.2 | 20 | 19 | 25.7 | 18 | 13.9 | 17 |
| 100% ($MN/m^2$) | 22.1 | ND | 14.6 | 22 | 22 | 26 | 21 | 19.8 | 20 |
| 300% ($MN/m^2$) | 49.1 | ND | 44.9 | 56 | 51 | 40.6 | 48 | 47.4 | 48 |
| Tensile strength at break ($MN/m^2$) | 68.3 | ND | 66.7 | 65 | 67 | 55.3 | 70 | 66.4 | 71 |
| Elongation (%) | 384 | ND | 382 | 330 | 360 | 380 | 383 | 365 | 380 |
| Tear Strength DIN 53515 (kN/m) | 223.9 | ND | 136.3 | 221 | 228 | 221 | 231 | 147.9 | 219 |
| Compression Set DIN 53517 (22 hrs/70° C.) | 45.2 | ND | 23.3 | ND | ND | ND | 51 | 24.1 | 49 |
| Notch Impact −20° C. ($kJ/m^2$) DIN 53453 | 3.0 | ND | ND | ND | 5.0 | 17.0 | 8.0 | ND | 8.0 |
| Flex Modulus +20° C. (mPa) DIN 53452 | 256 | ND | ND | 507 | 350 | 237 | 218 | ND | 165 |
| Creep (%) 90° C.** DIN 53444 | ND | ND | 35 | ND | ND | ND | ND | 25 | ND |
| Abrasion DIN 53516 (mg) | 40 | ND | 32.8 | 35 | 34 | 40.6 | 41 | 37.6 | 41 |
| Abrasion at 56 rpm/ 3.5 kg load/10 min. | >2000 | 481 | ND | 347 | 300 | 119 | 230 | ND | 304 |

*Comparative Sample, not an example of the invention
**Residual Creep in % after 24 hours measured after 6 minutes; load = 5 $MPa/L_0$ = 10 mm
ND = not determined The data in Table I clearly demonstrate surprisingly improved severe resistance properties of the thermoplastic polyurethanes of the present invention over the prior art. In addition, the other mechanical properties are about the same as those of the prior art while impact at low temperatures and creep properties are considerably better.

What we claim is:

1. A thermoplastic polyurethane having high resistance to severe abrasion forces, said thermoplastic polyurethane comprising the reaction product of (1) a mixture of (a) 0.86 to 0.98 mole equivalent of a polyester diol having the molecular weight of from 650 to 5,000 and (b) 0.02 to 0.14 mole equivalent of a polyether diol having the molecular weight of from 2,900 to 5,000, and (2) a difunctional chain extender with (3) an organic diisocyanate.

2. The thermoplastic polyurethane of claim 1 wherein 0.88 to 0.95 mole equivalent of said polyester diol and 0.05 to 0.12 mole equivalent of said polyether diol is employed.

3. The thermoplastic polyurethane of claim 1 wherein 0.88 to 0.93 mole equivalent of said polyester diol and 0.07 to 0.12 mole equivalent of said polyether diol is employed.

4. The thermoplastic polyurethane of claim 1 wherein said polyester diol has the molecular weight of from 1,000 to 3,000.

5. The thermoplastic polyurethane of claim 1 wherein said polyether diol has the molecular weight of 2,900.

6. The thermoplastic polyurethane of claim 2 or claim 3 wherein said polyester diol has the molecular weight of from 1,000 to 3,000 and said polyether diol has the molecular weight of 2,900.

7. The thermoplastic polyurethane of claim 6 wherein said polyester diol is poly diol or poly diol and said polyether diol is poly diol, poly diol or poly diol.

8. The thermoplastic polyurethane of claim 6 wherein said polyether diol is poly diol, poly diol or poly diol.

9. The thermoplastic polyurethane of claim 1 wherein said difunctional chain extender is an amine, an aliphatic diol or ethoxylated hydroquinone having the molecular weight of from about 50 to about 250.

10. The thermoplastic polyurethane of claim 9 wherein said difunctional chain extender is 1,4-butanediol, 1,6-hexanediol or ethoxylated hydroquinone.

11. The thermoplastic polyurethane of any one of claims 1, 9 or 10 wherein about 2 to about 14 moles of said difunctional chain extender is employed for each mole of the mixture of said polyester diol and said polyether diol.

12. The thermoplastic polyurethane of claim 1 wherein said organic diisocyanate is an aromatic diisocyanate and wherein about 0.95 to about 1.10 moles of said aromatic diisocyanate is employed for each mole equivalent of said polyester diol, said polyether diol and said difunctional chain extender, combined.

13. The thermoplastic polyurethane of claim 12 wherein about 0.99 to about 1.07 moles of aromatic diisocyanate is employed for each of said polyester diol, said polyether diol and said chain extender, combined.

14. The thermoplastic polyurethane of claim 1 comprising the reaction product of (1) a mixture of (a) 0.88 to 0.925 mole equivalent of poly(butylene adipate) diol having the molecular weight of 2,000 and (b) 0.075 to 0.12 mole equivalent of poly(tetramethylene oxide) diol having the molecular weight of 2,900 and (2) 1 4-butanediol with (3) p,p'-diphenylmethane diisocyanate.

15. The thermoplastic polyurethane of claim 14 wherein 8.8 moles of 1,4-butanediol and 9.4 to 9.88 moles of p,p'-diphenylmethane diisocyanate are employed.

16. A shoe sole comprising the thermoplastic polyurethane of claim 1 or claim 5.

17. A skiboot comprising the thermoplastic polyurethane of claim 1 of claim 5.

18. A ski binding comprising the thermoplastic polyurethane of claim 1 or claim 5.

* * * * *

UNITED STATES PATENT AND TRADEMARK OFFICE
CERTIFICATE OF CORRECTION

PATENT NO. : 4,980,445

DATED : December 25, 1990

INVENTOR(S) : Hanno R. van Der Wal, Henry W. Bonk and John Penfold

It is certified that error appears in the above-identified patent and that said Letters Patent is hereby corrected as shown below:

Column 9, line 38, claim 7, " polyester diol is poly diol " should correctly read -- polyester diol is poly(butylene adipate) diol --.

Column 9, line 38, claim 7, " or poly diol " should correctly read -- or poly(oxycapropyl) diol --.

Column 9, line 39, claim 7, " is poly diol " should correctly read -- is poly(ethylene oxide) diol --.

Column 9, line 39, claim 7, " , poly diol " should correctly read --, poly(propylene oxide) diol --.

Column 9, line 39, claim 7, " or poly diol " should correctly read -- poly(tetramethylene oxide) --.

Column 9, line 41, claim 8, " diol is poly diol, " should correctly read -- diol is poly(ethylene oxide) diol, --.

Column 9, line 41, claim 8, " poly diol " should correctly read -- poly(propylene oxide) diol --.

Column 9, line 41, claim 8, " or poly diol " should correctly read -- poly(tetramethylene oxide) diol --.

Column 10, line 22, claim 13, " for each of said " should correctly read -- for each mole of said --.

Column 10, line 23, claim 13, " said chain extender " should correctly read -- said difunctional chain extender --.

UNITED STATES PATENT AND TRADEMARK OFFICE
CERTIFICATE OF CORRECTION

PATENT NO. : 4,980,445

DATED : December 25, 1990

INVENTOR(S) : Hanno R. van Der Wal, Henry W. Bonk and John Penfold

It is certified that error appears in the above-identified patent and that said Letters Patent is hereby corrected as shown below:

Column 10, line 29, claim 14, " and (2 ) 1 4- " should correctly read -- and (2) 1,4- --.

Signed and Sealed this

Eighth Day of September, 1992

Attest:

DOUGLAS B. COMER

Attesting Officer         Acting Commissioner of Patents and Trademarks